Feb. 13, 1934.   J. DE MOOY   1,947,430
LUBRICATOR
Filed Sept. 15, 1930
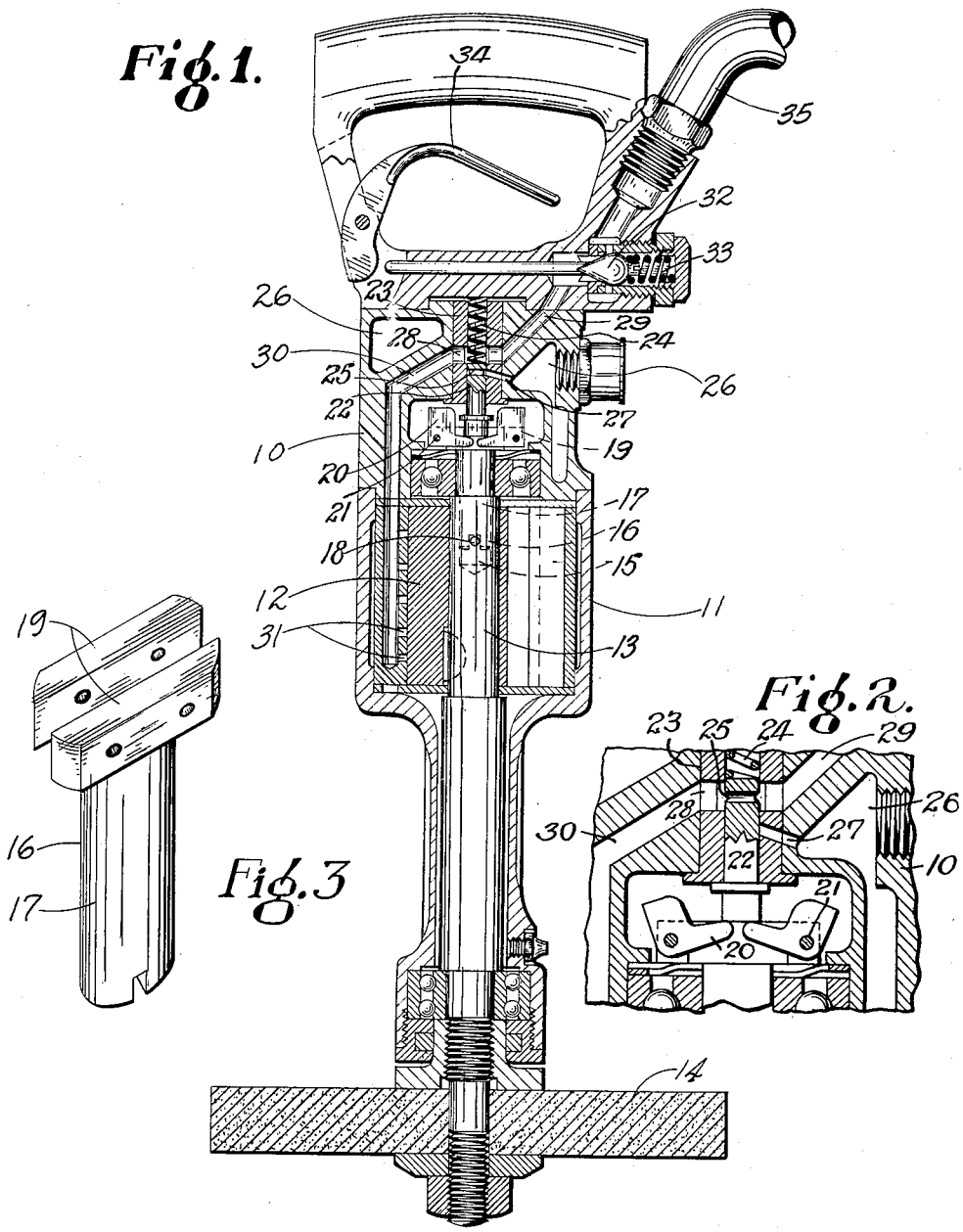
JOHN DE MOOY
INVENTOR
BY John E. Renfer
ATTORNEY Patented Feb. 13, 1934

1,947,430

UNITED STATES PATENT OFFICE 1,947,430

LUBRICATOR

John De Mooy, Cleveland, Ohio

Application September 15, 1930
Serial No. 481,823

12 Claims. (Cl. 184—55)

This invention relates broadly to fluid actuated machines and more specifically to mechanism to effect the lubrication of the working parts thereof.

One of the objects of the invention is to provide a lubricator for a fluid actuated machine which is organized for automatic control during certain predetermined speeds of the machine.

Another object is to provide a lubricator for a fluid actuated machine which is constructed to inject an intermittent charge of lubricant to the machine elements during the operation thereof.

Another object is to construct a lubricator for a fluid actuated machine which is capable of supplying a charge of lubricant in the path of the fluid stream during operation of said machine and to effect the lubrication of the working parts thereof through the agency of the lubricant laden fluid.

Another object is to provide a lubricator for a fluid actuated machine which is simple in construction, efficient and effective in operation.

Other objects and advantages more or less ancillary to the foregoing and the manner in which the various objects are realized reside in the specific construction and aggroupment of elements peculiar to the structure, as will become apparent from a more complete examination of this specification.

In the drawing, wherein is shown a preferred embodiment of the invention,

Fig. 1 is a longitudinal sectional view of a rotary fluid actuated machine showing the lubricator of the present invention in combination therewith, the various elements being shown in their relative positions when the machine is idle.

Fig. 2 is an enlarged sectional view of the lubricator illustrating the relative position of the various parts thereof during the operation of the machine.

Fig. 3 is a detailed perspective view of the yoke member.

Referring now more in detail to the drawing, the reference character 10 indicates generally a fluid actuated machine of the rotary type. Mounted within the casing 11 in the usual manner is a fluid actuated motor which consists generally of a rotor 12 having a plurality of vanes disposed about the periphery thereof and a rotor shaft 13 to which the rotor is keyed or otherwise suitably secured. To the outer end of the rotor shaft may be secured the cutting tool such as, for instance, a grinding wheel 14.

The inner end of the rotor shaft is provided with a longitudinal bore 15 within which there is disposed a yoke member 16 having a shank portion 17 and which is operatively associated with the rotor shaft by a key or driving pin 18. The yoke member 16 is formed with a bifurcated head 19 which is organized to support a governor of the centrifugal type.

The centrifugal governor comprises a pair of bell crank levers 20 pivotally secured by means of pins 21 to the yoke member between the furcations of the bifurcated head 19. The arms of the bell crank levers which are normally sustained in parallel relation to the axis of the rotor shaft are weighted as is customary in a centrifugal governor. The laterally disposed arms of the bell crank levers are arranged in abutting relation to a collared plunger 22. This plunger is reciprocatively mounted in a bushing 23 and is urged against the lateral arms of the bell crank levers by a helical spring 24 retained within the axial bore of the bushing. A small aperture 25 is provided in the plunger 22 being located therein for fluid communication with a duct 27 which leads from an annular lubricant reservoir 26 within the casing 11.

A cross bore 28 in bushing 23 accommodates the flow of actuating fluid from a passage 29 to a canal 30. A plurality of ports 31 connecting the canal 30 to the rotor chamber direct the actuating fluid against the vanes of the rotor.

A valve 32, normally closed by a spring 33, may be opened by an operating lever or trigger 34 to admit fluid from the pressure line 35 to canal 30 to effectuate operation of the machine.

When the machine is idle the elements thereof assume the positions shown in Fig. 1. In such position lubricant will flow from the reservoir through duct 27 into the aperture 25 in the plunger 22. Upon opening valve 32 by means of trigger 34 actuating fluid will flow into passage 29, through cross bore 28 into canal 30 and thence through the ports 31 into the rotor chamber where it will impinge against the vanes of the rotor and cause the rotation thereof.

During the rotative event of the rotor shaft the weighted arms of the bell crank levers will be thrown radially outward by the centrifugal force initiated by the rotating members and will assume the position shown in Fig. 2. It will be seen that by this disposition of the bell crank levers the plunger 22 will be translated axially in the bushing 23 against the pressure of spring 24 and that the aperture 25 in the plunger will be disposed in the stream of the actuating fluid passing through the cross bore 28 in the bushing. The fluid stream in passing through the cross bore will eject the lubricant previously entrapped in the aperture 25 and entrain the same in the fluid thus providing lubrication to the working parts of the machine. When the operating valve is closed the mechanism will be rearranged to effect a recharge of lubricant in the aperture 25.

Although the foregoing description is necessarily of a detailed character in order to completely set forth the invention, it is to be understood that the specific terminology is not intended to be restrictive or confining and it is to be further understood that various rearrangements of parts and modifications of structural detail may be resorted to without departing from the scope or spirit of the invention as defined by the subjoined claims.

What I claim and desire to secure by Letters Patent is:

1. A lubricator for a fluid actuated machine having a rotative element comprising a lubricant injector including a plunger having an aperture therein, means for projecting said injector into the stream of the actuating fluid for injecting a charge of lubricant into said fluid stream during operation of said machine for transmission by the fluid to the moving parts of the machine, and means for retracting said injector from lubricant injecting position, the actuation of said projecting means being dependent upon a predetermined speed of operation of said machine.

2. A lubricator for a fluid actuated machine having an actuating fluid passage and a lubricant reservoir, a lubricant injector comprising a plunger having an aperture therein, means for maintaining said plunger retracted from said fluid passage when said machine is idle, said aperture being in fluid communication with said reservoir when in retracted position for permitting ingress of lubricant into said aperture, and means for projecting said plunger to entrap a charge of lubricant in the aperture and position the same in the fluid passage for entraining the entrapped lubricant in the fluid stream during operation of the machine for transmission by the fluid to the moving parts of the machine, said last mentioned means being responsive to a predetermined speed of operation of said machine.

3. A lubricator for a fluid actuated machine of the rotary type having an actuating fluid passage and a lubricant reservoir, a lubricant injector comprising a plunger having an aperture therein, means for maintaining said plunger retracted from said fluid passage when said machine is idle, said aperture being in fluid communication with said reservoir when in retracted position for permitting ingress of lubricant into said aperture, and means for projecting said plunger to entrap a charge of lubricant in the aperture and position the same in the fluid passage for entraining the entrapped lubricant in the fluid stream during operation of the machine for transmission by the fluid to the moving parts of the machine, said last means comprising a member associated with said plunger and operated due to the centrifugal force imparted thereto when the machine is actuated.

4. A fluid actuated machine of the rotary type comprising a rotor shaft, a rotor mounted thereon and a lubricator for injecting a charge of lubricant into the stream of the actuating fluid during operation of said machine, the operation of said lubricator being affected by a governor operated by the centrifugal force imparted thereto when the machine is operated.

5. A lubricator for fluid actuated machine of the rotary type having an actuating fluid passage and a lubricant enlarged reservoir, a lubricant injector comprising a member having a lubricant restricted reservoir therein, means for maintaining said member retracted from said fluid passage when said machine is idle, said restricted reservoir being in fluid communication with said enlarged reservoir when in retracted position for permitting ingress of lubricant into said restricted reservoir, means for projecting said member to entrap a charge of lubricant in the restricted reservoir and position the same in the fluid passage for entraining the entrapped lubricant in the fluid stream during operation of the machine for transmission by the fluid to the moving parts of the machine, said last named means comprising a rotatable governor being operated due to the centrifugal force imparted thereto during its rotation.

6. A lubricator for a fluid actuated machine of the rotary type having an actuating fluid passage and a lubricant enlarged reservoir, a lubricant injector comprising a member having a lubricant restricted reservoir therein, means for maintaining said restricted reservoir retracted from said fluid passage when said machine is idle, said restricted reservoir being in fluid communication with said enlarged reservoir when in retracted position for permitting ingress of lubricant into said restricted reservoir, means for projecting said member to entrap a charge of lubricant in the restricted reservoir and position the same in the fluid passage for entraining the entrapped lubricant in the fluid stream during operation of the machine for transmission by the fluid to the moving parts of the machine, said last named means comprising a rotatable governor being operated due to the centrifugal force imparted thereto during its rotation.

7. A lubricator for fluid actuated machines of the rotary type having an actuating fluid passage and lubricant reservoir, a lubricant injector comprising a plunger having an aperture therein, said injector being capable of penetration into said passage for injecting a charge of lubricant into the stream of the actuating fluid during its flow through said passage, means normally maintaining said injector away from said passage, means affording the ingress of the lubricant from said reservoir to said injector when the latter is maintained away from said passage, and a rotatable member associated with said injector, the penetration of the latter into said passage being responsive to the movement of said member resulting from the centrifugal force imparted thereto during its rotation.

8. A lubricator for fluid actuated machines of the rotary type having an actuating fluid passage and lubricant reservoir, a lubricant injector comprising a plunger having an aperture therein, said injector being capable of penetration into said passage for injecting a charge of lubricant into the stream of the actuating fluid during its flow through said passage, a spring for maintaining said injector away from said passage, means affording the ingress of the lubricant from said reservoir to said injector when the latter is maintained away from said passage, and a rotatable member associated with said injector, the penetration of the latter into said passage being responsive to the movement of said member resulting from the centrifugal force imparted thereto during its rotation.

9. A lubricator for a fluid actuated machine of the rotary type having an actuating fluid passage and a lubricant reservoir, a member shiftable into said passage for injecting a measured charge of lubricant into the stream of motive fluid flowing through said passage and retractable from the latter into lubricant recharging position, and means responsive to a predetermined speed of said machine for actuating said member.

10. In a lubricator for a fluid actuating machine having a rotatable member, means including a lubricant conveying element responsive to the movement resulting from the centrifugal force imparted to said member during a predetermined rotation of the latter for discharging a measured charge of lubricant into the motive fluid actuating said machine.

11. In a lubricator for a fluid actuated rotary machine, means including a lubricant conveying member responsive to a predetermined speed of rotation of said machine for admitting a measured charge of lubricant into the motive fluid actuating said machine.

12. In a lubricator for a fluid actuated rotary motor, a lubricant conveyor, an actuating fluid passage and a lubricant reservoir, means responsive to a predetermined speed of said motor for shifting said lubricant conveyor into said passage, and other means responsive to a reduction of the speed of said motor for shifting said lubricant conveyor into communication with said reservoir.

JOHN DE MOOY.